(12) United States Patent
Hirsch

(10) Patent No.: US 7,583,627 B2
(45) Date of Patent: Sep. 1, 2009

(54) LOW LATENCY RADIO BASEDBAND INTERFACE PROTOCOL

(75) Inventor: Olaf Hirsch, Sunnyvale, CA (US)

(73) Assignee: NXP B.V., Eindhoven (NL)

( * ) Notice: Subject to any disclaimer, the term of this patent is extended or adjusted under 35 U.S.C. 154(b) by 744 days.

(21) Appl. No.: 10/526,591

(22) PCT Filed: Oct. 2, 2003

(86) PCT No.: PCT/IB03/04333

§ 371 (c)(1),
(2), (4) Date: Sep. 29, 2005

(87) PCT Pub. No.: WO2004/032432

PCT Pub. Date: Apr. 15, 2004

(65) Prior Publication Data

US 2006/0013293 A1  Jan. 19, 2006

(51) Int. Cl.
*H04B 7/216* (2006.01)
(52) U.S. Cl. .................. 370/320; 455/550.1
(58) Field of Classification Search ............ 370/310, 370/342; 455/550.1
See application file for complete search history.

(56) References Cited

U.S. PATENT DOCUMENTS 6,590,888 B1 * 7/2003 Ohshima ............ 370/342
6,987,767 B2 * 1/2006 Saito ................. 370/394

* cited by examiner

*Primary Examiner*—Temica M Beamer

(57) ABSTRACT

A low latency radio/baseband interface protocol is provided. In one embodiment thereof, 8b/10b encoding is used, which has distinct control characters and data characters. Control characters are used to define the beginning of a frame. More particularly, in accordance with one aspect of the invention, signaling between a baseband portion of a communications apparatus and a radio portion of the communications apparatus is achieved by encoding data units of a given number of bits into codes, each code being a data unit of a number of bits greater than the given number of bits. Multiple different types of data exchanges are defined, and a different code is assigned to each type of data exchange. For a given data exchange, a data exchange type is selected in accordance with data to be exchanged, and a message frame is formed in accordance with the data exchange type selected, the message including a code identifying the data exchange type. The message frame is then transmitted between the baseband portion and the radio portion.

25 Claims, 5 Drawing Sheets

LEGEND

= OPTIONAL FIELD

SOF = START OF FRAME
SAMPLING DATA = UP OR DOWN SAMPLING DATA
CTRL = CONTROL DATA
INT = INTERRUPT
MON = MONITOR DATA

RAA = REGISTER ADDRESS AVAILABLE
RWn = READ/WRITE INDICATION (0=WRITE, 1=READ)
DR = DATA READY
RA = REGISTER ADDRESS
RD = REGISTER DATA

LOW LATENCY RADIO BASEDBAND INTERFACE PROTOCOL

The present invention relates to communication protocols, particularly for communication between the baseband and RF (radio) sections of a wireless communications device.

Many types of data encoding are known. One such date encoding scheme, known as 8b/10b, takes byte inputs and generates a DC-balanced stream (i.e., a stream having an equal number of 1s and 0s) with a maximum run-length of five. Some of the individual 10-bit codes will have an equal number of 1s and 0s, while others will have either four 1s and six 0s, or, six 1s and four 0s. In the latter case, the disparity between 1s and 0s is used as an input to the next 10-bit code generation, so that the disparity can be reversed, and maintain an overall balanced stream. For this reason, some 8-bit inputs have two valid 10-bit codes, depending on the input disparity. The eight input bits are split into two groups, a five-bit group and a three-bit group.

In addition to 256 data characters, the 8b/10b code defines twelve special control characters. The 256 data characters are named Dx.y, and the special control characters are named Kx.y. The x value corresponds to the five-bit group, and the y value to the three-bit group.

The special control characters indicate, for example, and idle condition, test data, or data delimiters. In applications where encoded characters are transmitted bit-serially, the comma character (K28.5) is commonly used for alignment purposes, as its 10-bit code does not normally occur elsewhere in the encoded bit stream. In particular, the comma character never appears within a concatenation of two 10-bit encoded characters. This property allows for easy detection of the word boundary in a bit stream. In addition, the comma character has a substring of alternating 1's and 0's to make it easy to phase lock to the incoming bit stream. (The comma character is used both within Fiber Channel and Gigabit Ethernet standards.)

Also known are various types of interfaces between the baseband and RF sections of wireless communications devices. Such interfaces have commonly been predominantly analog in nature. More recently, digital interfaces have begun to be used.

Desirably, the interface between the baseband and RF sections should exhibit low latency. For example, when communications are being established, a transmission may include a known preamble portion. During this preamble portion, signals from the radio section are communicated to the baseband section, where an AGC (automatic gain control) determination is made such that the digital values received in the baseband section coincide with the known digital values transmitted. Corresponding AGC control data is then sent back to the radio section. The control loop so defined must be low latency to allow for various other operations to also be performed during the preamble. Other similar examples may be cited in which low latency is required or desirable.

The present invention, generally speaking, provides for a low latency radio/baseband interface protocol. In one embodiment thereof, 8b/10b encoding is used, which has distinct control characters and data characters. Control characters are used to define the beginning of a frame. More particularly, in accordance with one aspect of the invention, signaling between a baseband portion of a communications apparatus and a radio portion of the communications apparatus is achieved by encoding data units of a given number of bits into codes, each code being a data unit of a number of bits greater than the given number of bits. Multiple different types of data exchanges are defined, and a different code is assigned to each type of data exchange. For a given data exchange, a data exchange type is selected in accordance with data to be exchanged, and a message frame is formed in accordance with the data exchange type selected, the message including a code identifying the data exchange type. The message frame is then transmitted between the baseband portion and the radio portion.

The invention will be better understood upon reference to the following detailed description and accompanying drawing. In the drawing.

Figure 1:
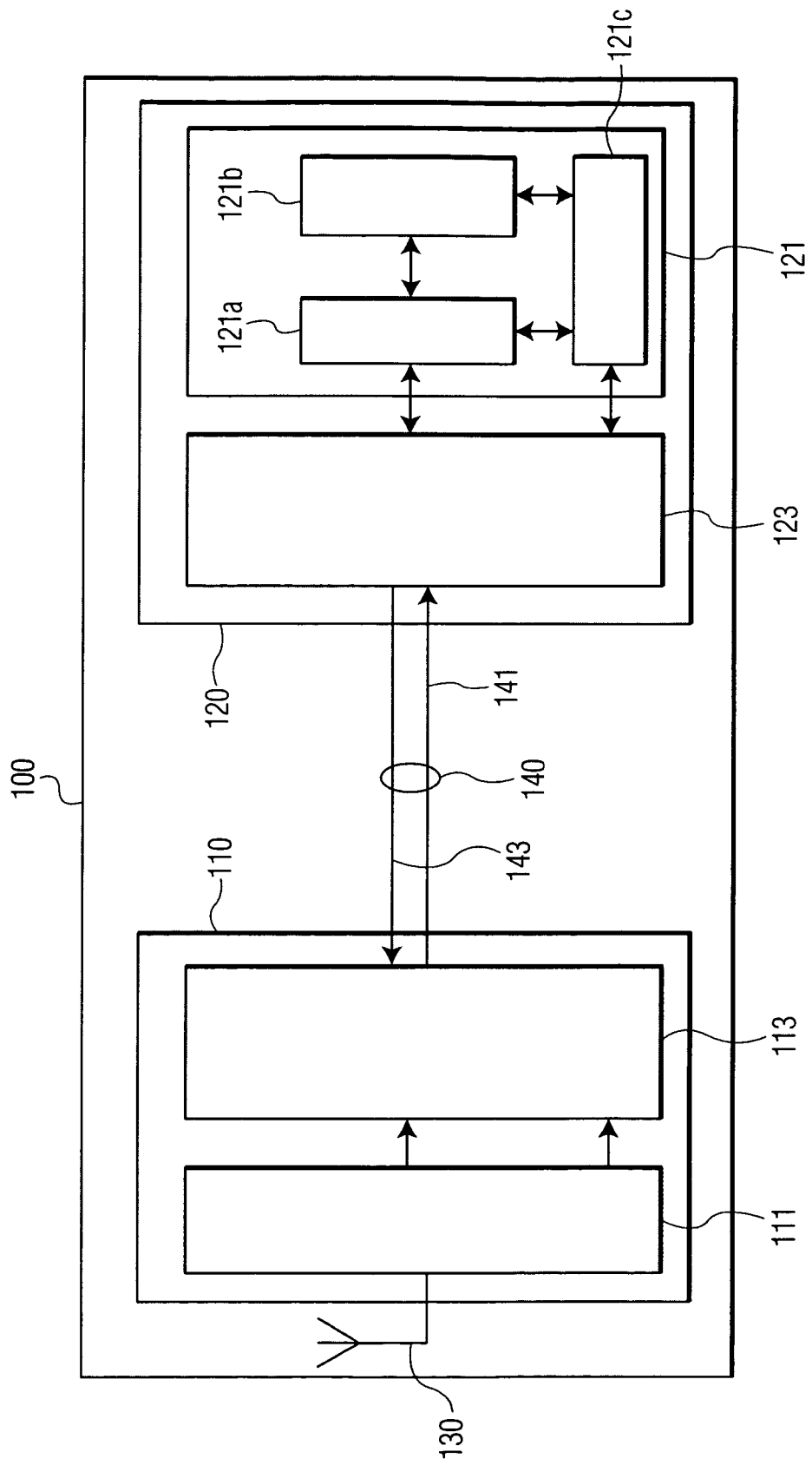
FIG. 1 is a block diagram of a communication system with which the present invention may be used.

Referring now to FIG. 1, there is shown a circuit diagram of a communication system 100 in which the present low-latency radio/baseband interface may be used. The communication system includes a radio section 110 having an RF core 111 and a first radio/baseband interface circuit 113, and a baseband section 120 having a baseband core 121 and a second radio/baseband interface circuit 123.

The RF core 111 is connected to an antenna 130. The baseband core 121 includes a physical layer (PHY) block 121a, a medium access control layer (MAC) block 121b, and a control block 121c, the blocks being interconnected to form an integrated baseband core in a manner known in the art.

Two types of signals—data and control signals—are exchanged between the RF core 111 and the first radio/baseband interface circuit 113, on the one hand, and the baseband core 121 and the second radio/baseband interface circuit 123 on the other hand.

The first and second radio/baseband interface circuits 113 and 123 communicate to each other through a digital radio/baseband interface 140. In an exemplary embodiment, the radio/baseband interface 140 is a low-power, differential, high-speed serial interface loosely based on the physical layer of serial ATA. The interface 140 has two differential pairs 141 and 143, or four wires. One pair 141 has the line driver on the radio side and the receiver on the baseband side; the other pair 143 has the line driver on the baseband side and the receiver on the radio side.

In an exemplary embodiment, the interface 140 uses an 8b/10b code to transmit the data and clock over the same interface.

Figure 4:
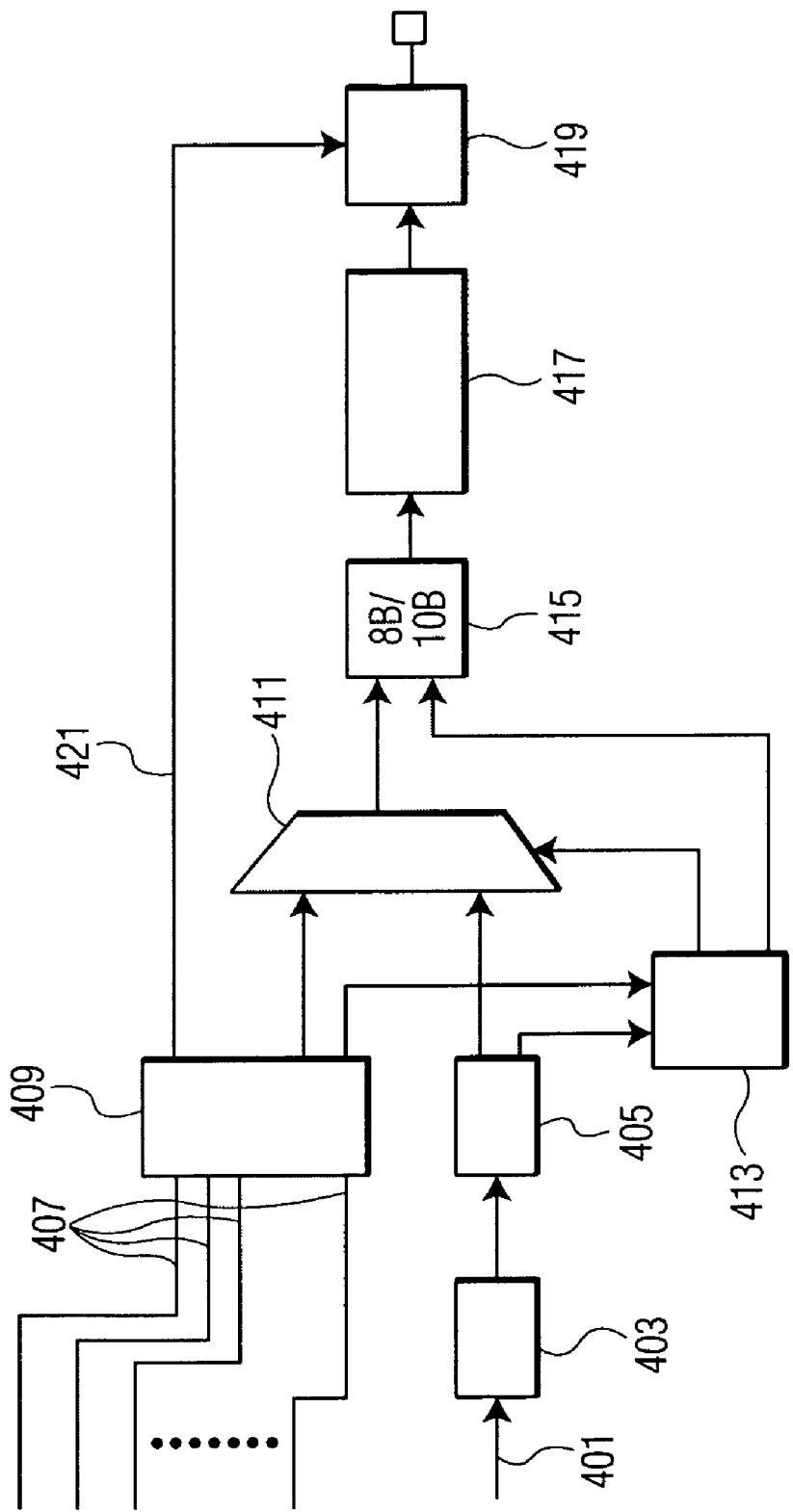
FIG. 4 is a diagram illustrating in greater detail a transmit portion of the radio/baseband interface circuit of FIG. 1.

Referring to FIG. 4, there is shown in greater detail a transmit portion ("transmitter") of the radio/baseband interface circuit of FIG. 1. Information to be transmitted may be either sample information or non-sample information ("control information). Sample information is produced by an analog to digital converter (ADC) 403 in response to a signal 401 from the core 111 or 121. Samples are buffered in a buffer 405. Control information is received from the core on a bus 407 and is applied to a control block 409.

The control block 409 performs the framing of the control information. Control information can be register access information (Addr,Data) or other control information like Received Signal Strength (RSSI), Low Noise Amplifier/Variable Gain Amplifier (LNA/VGA) settings etc.

Both the buffer 405 and the control block 409 have data output signals connected to a multiplexer 411. In addition, both blocks have control signals connected to a control/select block 413, which produces a control signal CTRL and a select signal SEL. The select signal SEL determines whether ADC data is input to an 8b/10b converter 415 or whether a control frame is input to the 8b/10b converter. The control signal CTRL controls the 8b/10b converter—in particular, whether it generates a 8b/10b control character or a data character. If the ADC buffer 405 is empty and no control information needs to be transmitted, the control/select block 413 selects a idle character to be transmitted from the 8b/10b converter.

A serializer 417 serializes the data from the 8b/10converter 415, and a line driver 419 converts the serial data into the electrical equivalent.

A common mode set signal 421 is set if the protocol requires that the common mode signal be set or if data is being transmitted.

Figure 5:
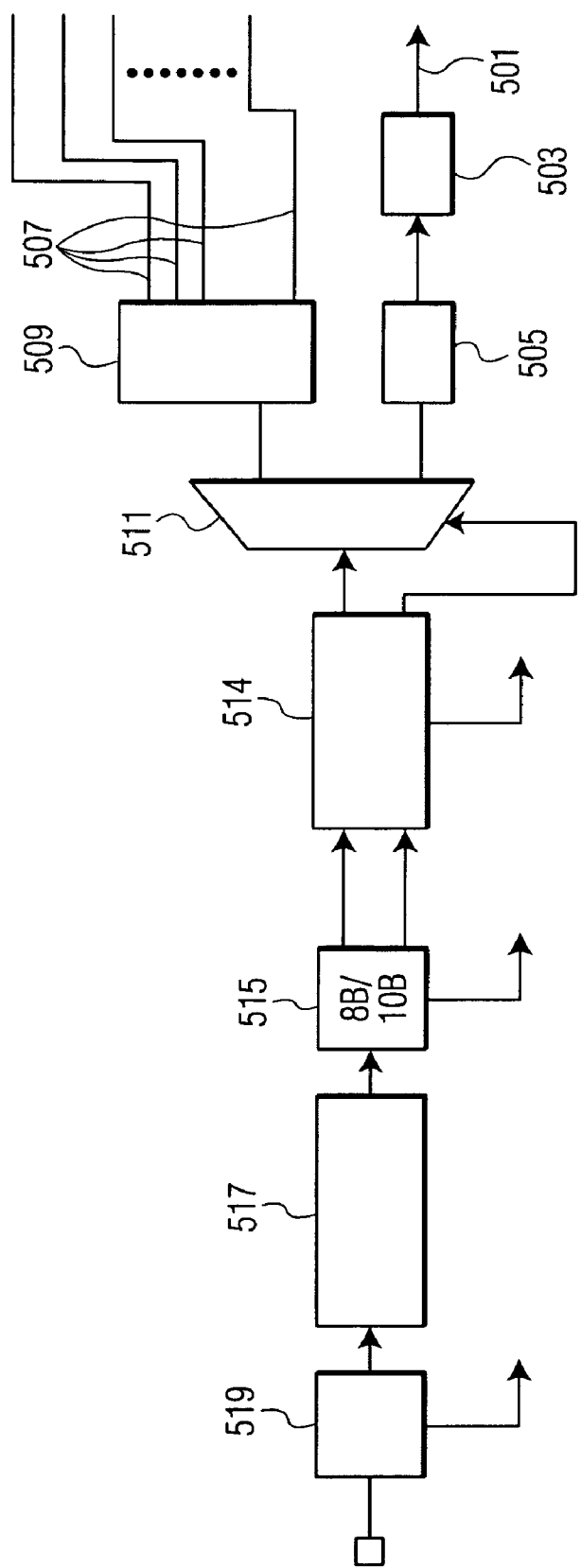
FIG. 5 is a diagram illustrating in greater detail a receive portion of the radio/baseband interface circuit of FIG. 1.

Referring to FIG. 5, there is shown in greater detail a receive portion ("receiver") of the radio/baseband interface circuit of FIG. 1.

A line receiver 519 receives the electrical signal from the line, recovers the clock and applies data a clock signals to a deserializer 517, which deserializes the data.

The deserialized data is input into a 8b/10b decoder 515. The decoder has three outputs: a DATA output, a CTRL' output, and an 8b/10b error signal output. The 8b/10b error signal signals an 8b/10b decoder error due to a transmission error. CTRL' signals whether a control character has been received, and DATA carries the value of the received character. A Control Frame Detect block 514 detects whether a control frame has been received. A CRC error signal is set if a control frame was received with an CRC error due to a transmission line error. If a control frame has been received, the CTRL' signal is set so that the control frame is routed through a demultiplexer 511 to the a control block 509. If no control frame is being received, the data is written to a buffer 505. The buffer data is read by a DAC 503 and converted to an analog signal 501.

The control frame received by the control block 509 is decoded. Depending on the control frame, registers are read/ written or control signals are set Note that in FIGS. 4 and 5 some of the functionality represented by the blocks can be distributed slightly differently, but in a typical implementation all the described functionality will be provided in one way or another.

Two transport layer alternatives are provided for. In a first transport layer alternative, the default configuration of the digital radio/baseband interface 140 provides a sampling data bandwidth of 800 Mbps and a control bandwidth of 320 kbps at an interface latency of 100 ns. Sampling data rate can be increased at the cost of higher interface latency.

In the second transport layer alternative, the default configuration of the digital radio/baseband interface 140 provides a sampling data bandwidth of 800 Mbps. The remaining bandwidth of 320 Mbps is available to transmit control and other information. In addition to data samples and control information the interface can transmit continuous data like RSSI values. The interface latency in the default configuration is 18.75 ns.

The interface 140 supports most transceiver architectures. Sampling data can either be from a low IF or I/Q transceiver. The interface 140 controls the radio either through register access or through a parallel control field.

In an exemplary embodiment, the radio/baseband interface 140 uses a number of registers in the radio to configure and control the interface. Once such register is the RFBBIF Control Register, described in the following table:

TABLE 1

RFBBIF_CTRL—Radio/Baseband Interface Control Register

| Bit | Symbol | Access | Value | Description |
|---|---|---|---|---|
| 15:4 | Reserved | | | Read and write as zero |
| 3 | I_Q | R/W[1] | | Multiplexed I/Q values (I first) or low IF samples |
| | | | 0x0* | Low IF |
| | | | 0x1 | I/Q |
| 2 | LOOP | R/W | | Loop back mode for streaming data |
| | | | 0x0* | Disabled |
| | | | 0x1 | Enabled |
| 1 | xMODE_UP | R/W | | Type of frames transmitted in the up-link |
| | | | 0x0* | Idle Frames |
| | | | 0x1 | Streaming frames |
| 0 | MODE_DOWN | R/W | | Type of frames transmitted in the down-link |
| | | | 0x0* | Idle Frames |
| | | | 0x1 | Streaming Frames |

[1]Read only for Radios with either I/Q or low IF output
Legend:
*reset value;
~*reset value not defined The interface 140 has four states: OFF, SLEEP, ACTIVE and CLOCK. The current state is controlled through a radio/ baseband state register, RFBBIF_STATE:

TABLE 2

RFBBIF_STATE—Radio/Baseband State Register

| Bit | Symbol | Access | Value | Description |
|---|---|---|---|---|
| 15:2 | Reserved | | | Read and write as zero |
| 1:0 | STATE | R/W | | Interface state definition. When written the interface transitions into the new state. Transitions from SLEEP and CLOCK are not possible be writing to this register. |

Legend:
*reset value;
~*reset value not defined

During the ACTIVE state control communication and data streaming in both directions is possible.

The SLEEP state is entered by programming register RFBBIF_STATE to the SLEEP state. After the command is issued the baseband and radio sections 110 and 120 can switch off the interface 140.

In order to transition out-off SLEEP state, the baseband section 120 switches on the common mode signal for the up-link. The radio section 110 switches on the common mode signal for the down-link and starts an initialization sequence. Once the initialization sequence is completed, the interface enters ACTIVE state.

The CLOCK state is a special power-down state in which only the down-link of the interface stays active to provide a timing reference for the baseband section 120. The up-link is powered off. The CLOCK state is entered by programming register RFBBIF_STATE to CLOCK state in the radio. After the command is issued the, PHY block 121a and the radio section 110 can power down the up-link. Once powered down, the interface enters the CLOCK state.

In order to leave the CLOCK state to the ACTIVE state, the PHY block 121a applies the common mode signal to the up-link. After a short (e.g., 10 ns) delay, the baseband section 120 sends one SYNC primitive to the radio section 110. After the SYNC primitive has been sent, the radio/baseband interface 140 enters the ACTIVE state.

The interface 140 is in the OFF state while the system is not powered up. The OFF state is automatically exited after power-up of the system. In order to exit the OFF state after power-up, the radio section 110 switches on its reference oscillator (not shown). The reference clock may also optionally be supplied to the baseband section 120. The radio section 110 executes an initialization sequence. After executing the initialization sequence, the interface transitions to the ACTIVE state.

The interface 140 can enter the OFF state from all states by switching off the power of the system.

In an exemplary embodiment, data exchanges between the radio section 110 and the baseband section 120 are encoded using 8b/10b encoding identical to that specified in ANSI X3.230-1994 (FC-PH), clause 11. The 8b/10b transmission code encodes an octet into a 10-bit code word. The code word is chosen as such that the code has enough zero-one transitions to facilitate clock recovery in the receiver. The code is DC balanced; i.e., it has the same amount of ones and zeros in a sufficiently long data stream. The running disparity of the code never exceeds one.

The transmission code supports error detection in the receiver, as not all ten-bit code words are valid code words.

Data is sent LSB first.

The oscillator in the radio section 110 is the timing master in ACTIVE and CLOCK state. All clocks in the baseband section 120 relevant to the synchronization of the system are phase locked to this oscillator. This phase-locking can be done by keeping the down-link of the interface active with an random 8b/10b code sequence.

In the SLEEP state the phase lock can be broken in order to save power. The baseband section 120 can use a different clock or oscillator during SLEEP state. Before entering the ACTIVE state, the baseband section 120 phase locks its clock with the radio again.

The up-link is phase locked to the down-link of the radio/baseband interface 140.

Before the radio/baseband Interface 140 is used to transmit data, it is initialized with a training sequence in order to phase lock the PLLs of the interface (not shown) in the down-link and the up-link of the interface 140.

The initialization sequence is defined to be six repetitions (150 us) of the following SYNC primitive: K28.3, D21.4, D21.5, D21.5.

The 8b/10b receiver should assume either positive or negative disparity after initialization.

Preferably, the initialization starts with initializing the down-link with the initialization sequence. After the down-link is initialized, the up-link is initialized through the initialization sequence.

In order to better appreciate the low-latency radio/baseband interface, an alternative interface that is not low-latency will first be described.

Figure 2:
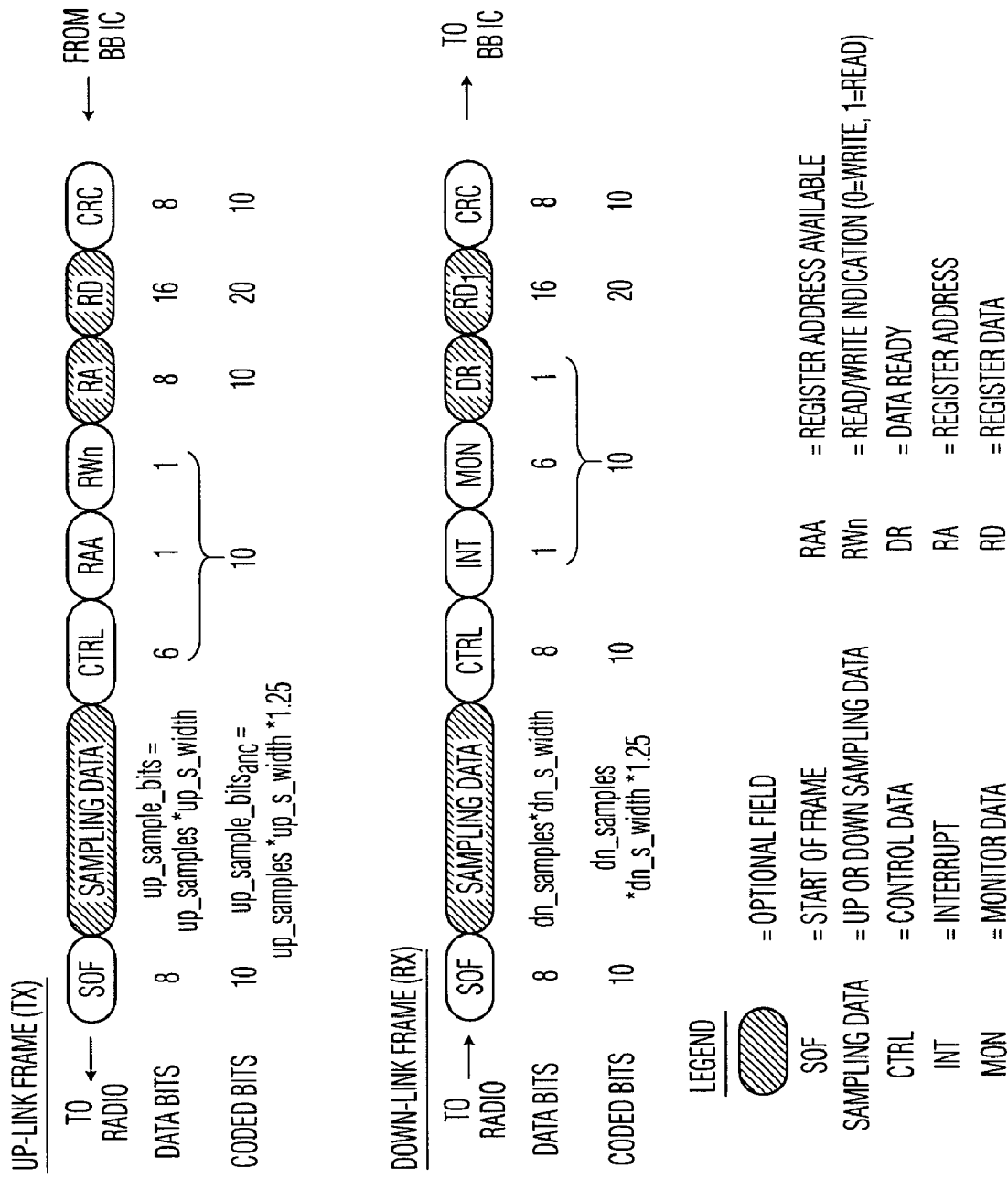
FIG. 2 is a diagram illustrating a first radio/baseband interface protocol.

FIG. 2 illustrates a first alternative of the radio/baseband frame protocol. Two frame formats have been defined; one for the up-link, and one for the down-link. Each frame starts with a SOF symbol followed by the sampling data field, one or more multi-purpose control fields, and some fields that together provide access to the registers inside the radio section 110. Each frames ends with a CRC field.

A detailed description of the fields is given below.

The frame length is determined by the latency requirements for time-critical control signals that have to cross the radio/baseband interface 140 (e.g. AGC control).

The overall latency is given by the latency due to the interface itself and the latency of the implementation of the serializer 417, deserializer 517, 8b/10b encoder and decoder 415 and 515 and other blocks. The following calculation will only take the latency of the interface into account.

The average allowable frame length is given by:

$$\text{frame\_length}_{enc} = f_{clk} \times t \text{ latency(max)}$$

For an interface latency of 100 ns and a frequency of 1.6 GHz the average frame length is given by:

$$\text{frame\_length}_{enc} = 1.6 \times 10^9 \times 100 \times 10^{-9} = 160 \text{ bit.}$$

The frame length before 8b/10b encoding is given by:

$$\text{frame\_length} = 160 \times 8/10 = 128 \text{ bit} = 16 \text{ bytes}$$

Due to optional fields, the actual frame length can vary. The different configuration options for the RF-BB frames are shown in Table 3 and Table 4 for 10 sampling data samples.

TABLE 3

| | | | | Radio/Baseband Up-Link Frame | | | | |
| --- | --- | --- | --- | --- | --- | --- | --- | --- |
| | | | | Sample | RA | RD | Frame length | |
| SOF | RAA | RWn | | Field | field | field | coded bits | data bits |
| | | | | Streaming Frame | | | | |
| SOF1 | 0 | X | | yes | no | no | 3 × 8 = 104 | 13 × 10 = 130 |
| SOF1 | 1 | 0 | | yes | yes | yes | 16 × 8 = 128 | 16 × 10 = 160 |
| SOF1 | 1 | 1 | | yes | yes | no | 14 × 8 = 112 | 14 × 10 = 140 |
| | | | | Idle Frame | | | | |
| SOF2 | 0 | X | | no | no | no | 3 × 8 = 24 | 3 × 10 = 30 |
| SOF2 | 1 | 0 | | no | yes | yes | 6 × 8 = 48 | 6 × 10 = 60 |
| SOF2 | 1 | 1 | | no | yes | no | 4 × 8 = 32 | 4 × 10 = 40 |

TABLE 4

| | | Radio/Baseband Down-Link Frame | | | |
|---|---|---|---|---|---|
| | | Sample | RD | Frame length | |
| SOF | DR | Field | field | coded bits | data bits |
| Streaming Frame | | | | | |
| SOF1 | 0 | yes | no | 14 × 8 = 112 | 14 × 10 = 140 |
| SOF1 | 1 | yes | yes | 16 × 8 = 128 | 16 × 10 = 160 |
| Idle Frame | | | | | |
| SOF2 | 0 | no | no | 4 × 8 = 32 | 4 × 10 = 40 |
| SOF2 | 1 | no | yes | 6 × 8 = 48 | 6 × 10 = 60 |

The frame length is such that the average over two frames equals frame_length data bytes or less. If no sampling data is transmitted, the frame length is reduced considerably. This reduced frame length has the benefit that the latency for Idle Frames can be up to 80% shorter than the latency for Streaming Frames, resulting in a latency of about 20 ns. This low latency is very important in time-critical loops, like e.g. the AGC.

If no frames are to be send on the up-link or down-link, the interface 140 inserts random 8b/10b symbols between frames.

Start of Frame. The SOF field defines the start-of-frame preamble. Two different preambles are used to differentiate between streaming frames (SOF1) and idle frames (SOF2).

SOF1 is chosen to be the 8b/10b control character K28.1, and SOF2 is control character K28.7. Both characters are comma characters to facilitate frame synchronization.

Sampling Data Fields. The sampling data field is only available in streaming frames. The sampling data field contains the up- or down-link sampled data from the ADCs and DACs (not shown) in the radio section 110.

The sampling data field is only used together with the SOF2 symbol.

A radio/baseband interface Data Sample Format Register is used to specify the data sample format, as follows:

TABLE 5

RFBBIF_SMPL—Radio/Baseband Interface Data Sample Format Register

| Bit | Symbol | Access | Value | Description |
|---|---|---|---|---|
| 15:8 | SAMPLES | R/W[1] | 0x8* | Data samples per Frame in alternative 1 or data samples per SMPL field |
| 7.0 | WIDTH | R/W[1] | 0xA* | Bits per data sample |

[1]Read only for Radios with fixed frame format
Legend:
*reset value;
~*reset value not defined The values dn_samples and up_samples define the number of sampling data samples in the down- and up-link, respectively. The values dn_s_width and up_s_width define the number of bits in each sample for the down- and up-link, respectively. The values dn_sample_bits and up_sample_bits define the number of bits in the sampling data field for the down- and the up-link, respectively. The values $dn\_sample\_bits_{enc}$ and $up\_sample\_bits_{enc}$ define the number of 8b/10b encoded bits in the sampling data field for the down- and the up-link, respectively.

The recommended number of sampling data samples is set to eight and has been chosen such that it corresponds with the 40 Msamples/sec sample rate of the I/Q samples or 80 Msamples/sec for IF samples to/from a 802.11 g baseband processor. This arrangement reduces the amount of buffering that is required for the data samples, and minimizes the interface latency for the data samples.

Control Fields. The CTRL field is used for time-critical control signals, like AGC, but it can also be used to signal events that are not necessarily time-critical but can occur simultaneously to other signals. The up-link CTRL field is 6 bits wide and the down-link CTRL field is 8 bits wide.

The MON field in the down-link can be used to monitor values in the radio like RSSI.

The usage of the CTRL and MON fields depends on the radio manufacturer.

Register Data. A R/W register access to the radio is initiated by an up-link frame. The RAA field (Register Address Available) is set to one to indicate that the baseband section 120 requires access to one of the registers in the radio section 110. The current frame includes the address of the register that needs to be accessed. For a read access, the RWn field is set to one; for a write access the RWn field is set to zero.

In case of a write transaction, the up-link frame includes the register data that needs to be written to a radio register in the RD field. In case of a read transaction, one of the next down-link frames returns the register read data to the baseband section in the RD field.

The DR field (Data Ready) is set to one if the RD field contains a valid register value. In all other cases the DR field is set to zero.

No new register can be read until the previous read has been received in the down-link by the baseband section. The RA and RD fields in the up-link and down-link frames are optional and only required when a register in the radio needs to be read or written. The presence of the RA and RD fields is determined by the values of the RAA field and the R/W fields.

Cyclic Redundancy Check. The 8-bit CRC field is the last field in the frame and contains the result of the CRC calculation. The CRC value in the up-link is calculated over all data in the data in the frame after the SOF field. In the down-link the CRC is calculated over all data in the frame after the SOF field. On transmission the CRC is calculated before 8b/10b encoding; on reception the CRC is calculated after 8b/10b decoding.

In an exemplary embodiment, the CRC polynomial is $g(x)=x^8+x^2+x+1$. The CRC is calculated starting from an all zero state.

The interface latency of the foregoing protocol alternative in the default configuration is 100 ns.

Figure 3:
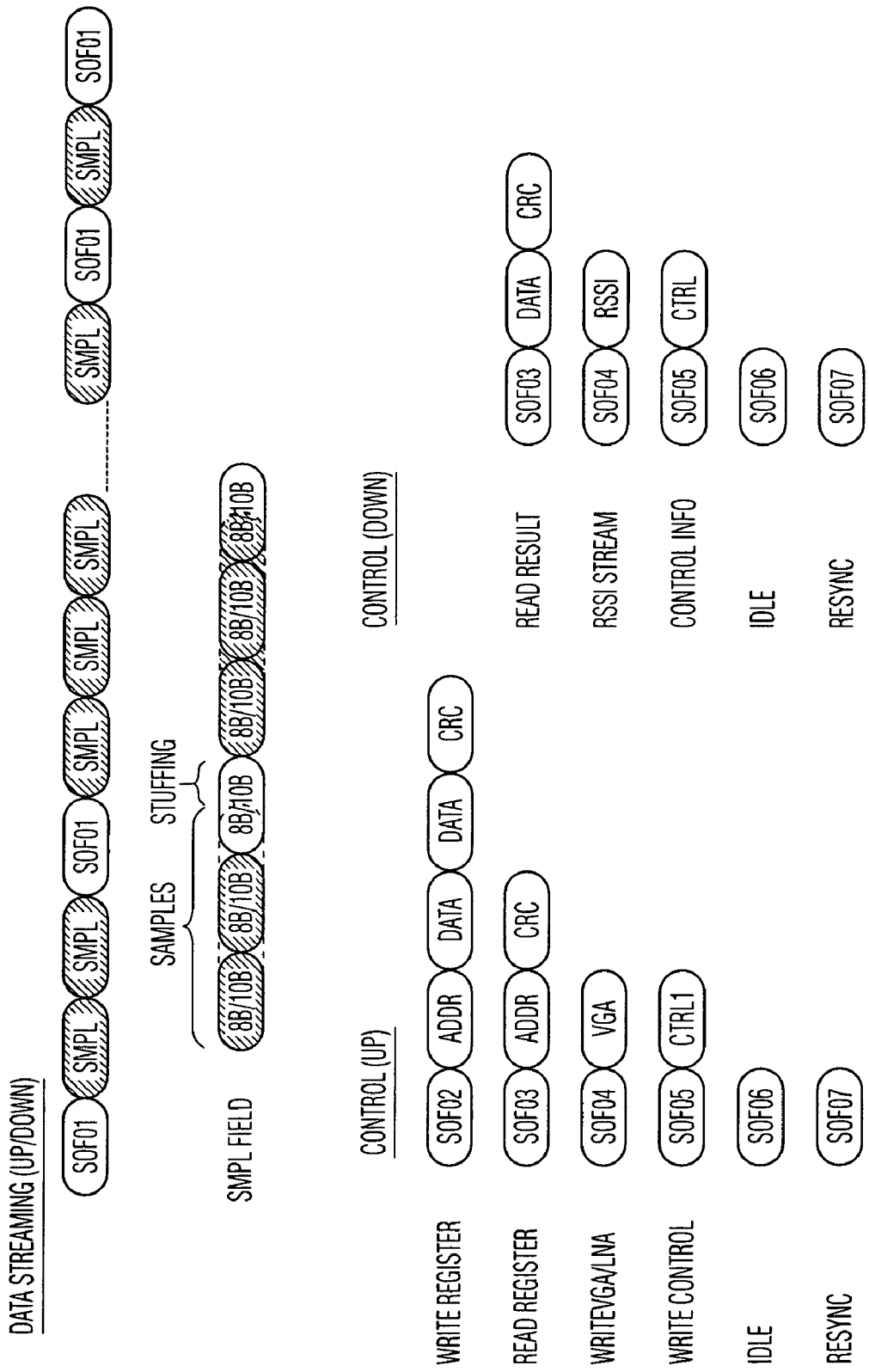
FIG. 3 is a diagram illustrating a second low-latency radio/baseband interface protocol.

FIG. 3 illustrates an alternative embodiment of the radio/baseband frame protocol, optimized for low latency. Several frame and streaming formats have been defined.

The transmission of a particular type of data stream or frame type is initiated by a 8b/10b control word. Table 6 lists the defined control words in an exemplary embodiment.

TABLE 6

SOF Identifier

| SOF Identifier | 8b/10b control word | Description |
|---|---|---|
| SOF01 | K28.1 | Streaming data samples, 8b/10b comma character |
| SOF02 | K28.0 | Write register |
| SOF03 | K28.2 | Read Register/Read Result |
| SOF04 | K28.3 | Write VGA/LNA/RSSI Stream |
| SOF05 | K28.4 | Write Control/Control Info |
| SOF06 | K28.6 | Idle Period |

TABLE 6-continued

SOF Identifier

| SOF Identifier | 8b/10b control word | Description |
|---|---|---|
| SOF07 | K28.7 | Resync, comma character |
| SOF08-12 | K28.5, K23.7, K27.7, K29.7, K30.7 | Reserved |

Data Streaming. Data streaming is initiated with the SOF01 control word. Sampling data follows the initial control word. SOF01 control words are also inserted to adapt the data rates between the sampling data and the interface rate.

During data streaming the other control frames are just inserted instead of the SOF01 rate adaptation symbols. At the end of an inserted control frame the transmission of data samples resumes without the requirement to send an additional SOF01 symbol.

Data Sample Field. The number of data samples and the bits per sample in the SMPL field is programmable through register access. If the number of bits in the SMPL is not a multiple of 8, the SMPL field is padded with zeros. This arrangement leaves the sample field to be extremely flexible as it could contain a single sample in case of a low IF radio, one I/Q sample pair or multiple samples.

Idle Frame. Idle frames are transmitted if no data samples have to be transmitted. The frame starts with a unique SOF06 symbol followed by random data. Approximately every 1000 data symbols a SOF07 symbol is inserted to facilitate resynchronization of the interface in case of a transmission error. Control frames are inserted into the idle frame stream in the same way as is done for the data sample stream.

Write Register. The write register frame can be inserted into a data sample stream or an idle period at any time. The frame starts with the unique SOF02 control word followed by eight address bits and 16 data bits. In order to provide additional error detection capability the frame ends with an 8-bit CRC.

Read Register. The read register frame can be inserted into a data sample stream or an idle period at any time. The frame starts with the unique SOF03 control word followed by eight address bits. In order to provide additional error detection capability, the frame ends with an 8-bit CRC. On arrival of a read register frame in the radio, the radio reads the internal register. The interface places the register value in the read result frame on the down link and inserts the frame at any time into the data sample stream or into an idle period.

Write VGA/LNA. The write VGA/LNA frame can be inserted into a data sample stream or an idle period at any time. The frame starts with the unique SOF04 control word followed by eight bits for the VGA/LNA settings.

Write Control. The write control frame can be inserted into a data sample stream or an idle period at any time. The frame starts with a unique SOF05 control word followed by eight control bits. The control bits can be used to enable the power amplifier (not shown), switch the antenna or switch between Rx and Tx.

RSSI Stream. The RSSI Stream frame can be inserted into a data sample stream or an idle period stream in the down link at any time. The frame starts with a unique SOF04 control word followed by an eight-bit RSSI value. The rate of the RSSI Stream frame is programmable. The user has to make sure that the combined data rate of the data sample stream and the RSSI stream frame does not exceed the bandwidth of the interface.

Control Information. The control information frame can be inserted into a data sample stream or and idle period stream in the down link at any time. The frame starts with a unique SOF05 word followed by eight control bits. The control bits can be used to indicate interrupts or other events generated by the radio. A control frame is send every time a control signal changes.

Cyclic Redundancy Check. The 8-bit CRC field is the last field in the register access frames and contains the result of the CRC calculation. The CRC value in the up-link is calculated over all data in the frame after the SOF field. In the down-link the CRC is calculated over all data in the frame after the SOF field. On transmission the CRC is calculated before 8b/10b encoding; on reception, the CRC is calculated after 8b/10b decoding. In an exemplary embodiment, the CRC polynomial is $g(x)=x8+x2+x+1$. The CRC is calculated starting from an all zero state.

Transmission Error Handling. After detection of a CRC error or 8b/10b decoding error the in the down link, the baseband sends a register access frame requesting the radio to transmit a Resync frame (SOF07).

If a CRC error or 8b/10b deciding error is detected in the up link, the radio sends a control information frame to the baseband requesting a Resync frame (SOF07).

In this alternative protocol, the interface latency in the default configuration is 18.75 ns. This low latency substantially simplifies integration of the radio and baseband sections.

Various modifications and refinements may be made to the basic interface as described. For example, control information can be inserted not only between data sample fields but between individual 8b/10b data words. In addition, control frames can be inserted into other control frames in case one control frame has a higher priority than another control frame. With regard to error detection and error handling, frame may be selectively protected with a CRC code depending on the importance of the information. If a transmission error occurs, a control information exchange between the baseband portion and the radio portion may be performed to inform the other side that the received data was corrupted. In accordance with still further modifications, if a certain number of consecutive idle codes occur, the interface may go into sleep mode automatically. Apart from the radio/baseband interface, the same or similar interface may be used elsewhere, for example between the physical layer portion and the medium access control portion.

The invention having thus been described with respect to specific embodiments, it will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims, rather than the foregoing description, and all changes which come within the meaning and range of equivalence thereof are intended to be embraced therein.

What is claimed is:

1. A method of performing signaling between a first portion of a communications apparatus and a second portion of the communications apparatus, comprising: encoding data units of a given number of bits to form codes, each code being a data unit of a number of bits greater than the given number of bits; defining multiple different types of information exchanges and assigning a different code to each type of information exchange; and for a given information exchange: forming a message frame in accordance with the information exchange type selected, the message frame including a code identifying the information exchange type; and transmitting the message frame between the first portion and the second portion.

2. The method of claim 1 wherein the first portion of the communications apparatus is a baseband portion and the second portion of the communications apparatus is a radio portion.

3. The method of claim 1 wherein the first portion of the communications apparatus is a physical layer portion and the second portion of the communications apparatus is a medium access control portion.

4. The method of claim 2 wherein sample data and control information are exchanged between the radio portion and the baseband portion, the sample data and control information being exchanged using different defined types of information exchanges.

5. The method of claim 4 wherein a data streaming exchange comprises sending from one of the radio portion and the baseband portion to the other one of the radio portion and the baseband portion multiple data sample fields in immediate succession.

6. The method of claim 4 wherein at least one of a number of data samples within a data sample field and a number of data bits per data sample is programmable.

7. The method of claim 4 wherein a number of data samples within a data sample field and a number of data bits per data sample are both programmable.

8. The method of claim 5 wherein a code assigned to a data streaming exchange is inserted between selected data sample fields to achieve a desired overall data rate.

9. The method of claim 8 wherein a control information exchange including a corresponding code is inserted between selected data sample fields so as to achieve a desired overall data rate.

10. The method of claim 4 wherein multiple different types of control information exchanges are defined.

11. The method of claim 1 wherein the codes convey both data or control information and timing information.

12. The method of claim 11 wherein the codes are 8b/10b codes.

13. The method of claim 12, wherein a control information exchange including a corresponding code is inserted between selected 8b/10b data words so as to achieve a desired overall data rate.

14. The method of claim 11 wherein at least one of the following is defined: an idle code indicating an idle condition and a resync code having a particularly distinctive pattern of ones and zeros.

15. The method of claim 11 wherein both of the following are defined: an idle code indicating an idle condition and a resync code having a particularly distinctive pattern of ones and zeros.

16. The method of claim 15 wherein an idle stream is transmitted, comprising multiple idle codes occurring in immediate succession.

17. The method of claim 16, wherein a sleep mode is automatically entered upon transmission or reception of a predetermined number of consecutive idle codes.

18. The method of claim 16 wherein a control information exchange including a corresponding code is inserted between selected idle codes.

19. The method of claim 1, comprising selectively adding CRC information to a message frame depending upon importance of the message frame.

20. The method of claim 1, comprising: detecting a transmission error; and in response to the transmission error, initiating a control information exchange reporting the transmission error.

21. The method of claim 1, comprising: initiating a first control information exchange; and prior to conclusion of the first control information exchange, initiating a second control information exchange of higher priority.

22. A circuit for wireless communications having an interface circuit for interfacing to another circuit also for wireless communications, the interface circuit comprising: encoding circuitry encoding data units of a given number of bits to form codes, each code being a data unit of a number of bits greater than the given number of bits; control circuitry for defining multiple different types of information exchanges and assigning a different code to each type of information exchange; framing circuitry for forming a message frame in accordance with the information exchange type selected, the message including a code identifying the information exchange type; and transmit circuitry for transmitting the message frame between the one circuit and the other circuit.

23. The interface circuit of claim 22 wherein the one circuit and the other circuit are a baseband portion of a communications apparatus and a radio portion of the communications apparatus.

24. A circuit for wireless communications having an interface circuit for interfacing to another circuit also for wireless communications, the interface circuit comprising: receive circuitry for receiving a message frame communicated between the one circuit and the other circuit, the message frame including a code identifying an information exchange type; decoding circuitry decoding codes to obtain data units of a given number of bits, each code being a data unit of a number of bits greater than the given number of bits; control and deframing circuitry for detecting multiple different types of information exchanges in accordance with different codes assigned to respective types of information exchange and for extracting information from the message frame in accordance with a detected information exchange type.

25. The interface circuit of claim 24 wherein the one circuit and the other circuit are a baseband portion of a communications apparatus and a radio portion of the communications apparatus.

* * * * *